United States Patent
Junio (10) Patent No.: US 12,527,638 B2
(45) Date of Patent: Jan. 20, 2026

(54) SYSTEMS, METHODS, AND DEVICES FOR ROBOTIC MANIPULATION OF THE SPINE

(71) Applicant: Mazor Robotics Ltd., Caesarea (IL)

(72) Inventor: Dany Junio, Tel Aviv-Jaffa (IL)

(73) Assignee: Mazor Robotics Ltd., Caesarea (IL)

( * ) Notice: Subject to any disclaimer, the term of this patent is extended or adjusted under 35 U.S.C. 154(b) by 837 days.

(21) Appl. No.: 17/526,985

(22) Filed: Nov. 15, 2021

(65) Prior Publication Data
US 2022/0218428 A1 Jul. 14, 2022

Related U.S. Application Data

(60) Provisional application No. 63/135,992, filed on Jan. 11, 2021.

(51) Int. Cl.
*A61B 17/70* (2006.01)
*A61B 34/00* (2016.01)
*A61B 34/10* (2016.01)
*A61B 34/30* (2016.01)

(52) U.S. Cl.
CPC .......... *A61B 34/70* (2016.02); *A61B 17/7002* (2013.01); *A61B 17/7046* (2013.01); *A61B 17/7077* (2013.01); *A61B 17/7086* (2013.01); *A61B 34/10* (2016.02); *A61B 34/25* (2016.02); *A61B 34/30* (2016.02); *A61B 2034/105* (2016.02)

(58) Field of Classification Search
CPC ....... A61B 17/70–7046; A61B 17/7074–7092; A61B 34/30–77
See application file for complete search history.

(56) References Cited

U.S. PATENT DOCUMENTS

| | | |
|---|---|---|
| 9,241,738 B2 | 1/2016 | Quevedo et al. |
| 9,408,716 B1 | 8/2016 | Reitblat et al. |
| 9,750,510 B2 | 9/2017 | Kostrzewski et al. |

(Continued)

FOREIGN PATENT DOCUMENTS

| | | |
|---|---|---|
| EP | 3479791 | 8/2020 |
| TW | I468143 | 1/2015 |

(Continued)

OTHER PUBLICATIONS

Tian et al. "A Robot-Assisted Surgical System Using a Force-Image Control Method for Pedicle Screw Insertion," PLOS ONE, Jan. 2014, vol. 9, No. 1, article e86346, 10 pages.

(Continued)

*Primary Examiner* — Eduardo C Robert
*Assistant Examiner* — Steven J Cotroneo
(74) *Attorney, Agent, or Firm* — Sheridan Ross P.C.

(57) ABSTRACT

A system for robotic spinal manipulation includes a first robotic arm comprising an end effector; a second robotic arm configured to hold a spinal rod; at least one processor; and a memory storing instructions for execution by the at least one processor. The instructions, when executed, cause the at least one processor to control the first robotic arm to link the end effector with at least one vertebral screw implanted in a vertebra of a spine of a patient; control the second robotic arm to hold the spinal rod in a predetermined pose; and cause the first robotic arm to move the at least one implanted vertebral screw into engagement with the spinal rod.

14 Claims, 5 Drawing Sheets

(56) References Cited

U.S. PATENT DOCUMENTS

| | | | |
|---|---|---|---|
| 9,814,535 B2 | 11/2017 | Bar et al. | |
| 10,188,480 B2 | 1/2019 | Scholl et al. | |
| 10,194,958 B2 | 2/2019 | Bobbitt et al. | |
| 10,201,377 B2 | 2/2019 | Hutchinson | |
| 10,271,832 B2 | 4/2019 | O'Neil et al. | |
| 10,349,995 B2 | 7/2019 | Walker et al. | |
| 10,631,907 B2 | 4/2020 | Zucker et al. | |
| 10,646,280 B2* | 5/2020 | Crawford | A61B 34/20 |
| 10,660,712 B2 | 5/2020 | Kostrzewski et al. | |
| 10,667,876 B2 | 6/2020 | Maillet et al. | |
| 2013/0345718 A1* | 12/2013 | Crawford | A61B 34/76 |
| | | | 606/130 |
| 2015/0051446 A1 | 2/2015 | Farritor et al. | |
| 2018/0110504 A1 | 4/2018 | McAfee et al. | |
| 2018/0214189 A1 | 8/2018 | Olea et al. | |
| 2018/0250075 A1* | 9/2018 | Cho | B25J 9/161 |
| 2018/0256259 A1* | 9/2018 | Crawford | A61B 6/12 |
| 2018/0289396 A1* | 10/2018 | McGahan | A61B 34/37 |
| 2018/0325608 A1* | 11/2018 | Kang | A61B 34/20 |
| 2019/0000553 A1* | 1/2019 | Lightcap | A61B 34/70 |
| 2019/0053859 A1 | 2/2019 | Couture et al. | |
| 2019/0175294 A1 | 6/2019 | Abbott et al. | |
| 2019/0231435 A1* | 8/2019 | Zucker | A61B 17/70 |
| 2020/0121404 A1* | 4/2020 | Morard | B25J 9/1694 |
| 2020/0237445 A1* | 7/2020 | Snyder | A61B 34/30 |
| 2020/0315708 A1* | 10/2020 | Mosnier | G16H 50/20 |
| 2020/0405395 A1* | 12/2020 | Gullotti | A61B 17/7082 |
| 2021/0045816 A1* | 2/2021 | Geist | A61B 34/30 |
| 2021/0177526 A1* | 6/2021 | Goyette | A61B 34/20 |
| 2022/0330986 A1* | 10/2022 | Finley | A61B 34/20 |

FOREIGN PATENT DOCUMENTS

| | | |
|---|---|---|
| WO | WO 2017/165183 | 9/2017 |
| WO | WO 2019/012520 | 1/2019 |

OTHER PUBLICATIONS

"Spinal Fusion Procedures With Robotic Guidance Technology," Medtronic, last updated Feb. 2020, 3 pages [retrieved online from: www.medtronic.com/us-en/patients/treatments-therapies/spinal-surgical-robotics.html].

International Search Report for International (PCT) Patent Application No. PCT/IL2022/050025, dated Apr. 19, 2022, 18 pages.

* cited by examiner

FIG. 8

SYSTEMS, METHODS, AND DEVICES FOR ROBOTIC MANIPULATION OF THE SPINE

CROSS REFERENCE TO RELATED APPLICATIONS

This application claims the benefit of U.S. Provisional Application No. 63/135,992, filed on Jan. 11, 2021, and entitled "Systems, Methods, and Devices for Robotic Manipulation of the Spine", which application is incorporated herein by reference in its entirety.

FIELD

The present technology generally relates to robotic and robot-assisted surgeries, and relates more particularly to robotic and robot-assisted spinal surgeries.

BACKGROUND

Surgical robots may assist a surgeon or other medical provider in carrying out a surgical procedure, or may complete one or more surgical procedures autonomously. Spinal surgeries may require movement of the spine, whether to secure a portion of the spine to a fixation rod or otherwise.

SUMMARY

Example aspects of the present disclosure include:

A system for robotic spinal manipulation, comprising: a first robotic arm comprising an end effector; a second robotic arm configured to hold a spinal rod; at least one processor; and a memory storing instructions for execution by the processor. The instructions, when executed, cause the at least one processor to: control the first robotic arm to link the end effector with at least one vertebral screw implanted in a vertebra of a spine of a patient; control the second robotic arm to hold the spinal rod in a predetermined pose; and cause the first robotic arm to move the at least one implanted vertebral screw into engagement with the spinal rod.

Any of the aspects herein, wherein the memory stores additional instructions for execution by the at least one processor that, when executed, further cause the at least one processor to: register a robotic coordinate space with a patient coordinate space.

Any of the aspects herein, wherein each of the first robotic arm and the second robotic arm are controllable in the robotic coordinate space.

Any of the aspects herein, wherein the first robotic arm comprises a force sensor for detecting a force exerted by the first robotic arm on the vertebral screw.

Any of the aspects herein, wherein the memory stores additional instructions for execution by the at least one processor that, when executed, further cause the at least one processor to: receive information from the force sensor corresponding to a detected force exerted by the first robotic arm on the vertebral screw; and control the robotic arm to maintain the detected force below a predetermined threshold.

Any of the aspects herein, wherein the memory stores additional instructions for execution by the at least one processor that, when executed, further cause the at least one processor to: receive patient information; calculate a vertebral bone quality based on the patient information; and generate the predetermined threshold based on the calculated vertebral bone quality.

Any of the aspects herein, wherein the predetermined threshold is received via a user interface.

Any of the aspects herein, wherein the at least one vertebral screw implanted in the vertebra of the patient comprises a plurality of vertebral screws implanted in a plurality of vertebrae of the patient.

Any of the aspects herein, wherein the at least one vertebral screw implanted in the vertebra of the patient is a first vertebral screw implanted in a first vertebra of the patient, and the memory stores additional instructions for execution by the at least one processor that, when executed, further cause the at least one processor to: cause the first robotic arm to release the first vertebral screw following engagement of the first vertebral screw with the rod; control the first robotic arm to link the end effector with a second vertebral screw implanted in a second vertebra of a patient, the second vertebra different than the first vertebra; and cause the first robotic arm to move the second vertebral screw into engagement with the spinal rod.

Any of the aspects herein, wherein the memory stores additional instructions for execution by the at least one processor that, when executed, further cause the at least one processor to: receive a plurality of images of at least a portion of the spine, the plurality of images generated sequentially during movement of the at least one implanted vertebral screw into engagement with the spinal rod; determine a pose of at least the portion of the spine in each of the plurality of images; and compare the determined pose of at least the portion of the spine to a target pose of at least the portion of the spine.

A system for robotically manipulating a spine, comprising: a robotic arm comprising an end effector; at least one processor; and a memory storing instructions for execution by the at least one processor. The instructions, when executed, cause the at least one processor to: receive a plurality of images of a spine of a patient, each image of the plurality of images showing the spine in a different pose; determine a range of motion of at least one vertebral body of the spine based on the plurality of images; cause the robotic arm to attach to the at least one vertebral body via a custom glove; and cause the robotic arm to move the at least one vertebral body to a predetermined pose without exceeding the determined range of motion.

Any of the aspects herein, wherein the custom glove is 3D-printed.

Any of the aspects herein, wherein the custom glove is configured to distribute a force exerted by the robotic arm on the at least one vertebral body over a surface of the at least one vertebral body.

Any of the aspects herein, wherein the predetermined pose is a pose that enables a vertebral screw implanted in the at least one vertebral body to be secured to a spinal rod.

Any of the aspects herein, wherein the robotic arm is a first robotic arm, and the memory stores additional instructions for execution by the processor that, when executed, further cause the at least one processor to: cause a second robotic arm different than the first robotic arm to lock the vertebral screw onto the spinal rod.

Any of the aspects herein, wherein causing the second robotic arm to lock the vertebral screw onto the spinal rod comprises causing the second robotic arm to tighten a set screw.

Any of the aspects herein, wherein the at least one vertebral body comprises at least three vertebral bodies.

A method for manipulating a spine, comprising: causing a robotic arm to grasp, via an end effector, a vertebral screw implanted in a vertebra of a spine of a patient; causing the robotic arm to exert a force on the vertebral screw to cause at least one of the vertebral screw or the vertebra of the spine to move toward a predetermined pose; detecting, with a sensor on the robotic arm, a magnitude of the exerted force; comparing the detected magnitude with a predetermined force threshold; when the detected magnitude is equal to or lower than the predetermined force threshold, causing the robotic arm to continue moving the at least one of the vertebral screw or the vertebra of the spine toward the predetermined pose; and when the detected magnitude is higher than the predetermined force threshold, causing the robotic arm to stop moving the at least one of the vertebral screw or the vertebra of the spine.

Any of the aspects herein, further comprising: causing the robotic arm to grasp, via the end effector, a plurality of vertebral screws implanted in a plurality of vertebrae of the spine of the patient; and causing the robotic arm to exert the force on each vertebral screw of the plurality of vertebral screws to cause each vertebral screw of the plurality of the vertebral screws or each vertebra of the plurality of vertebrae of the spine to move toward a corresponding predetermined pose.

Any of the aspects herein, wherein the predetermined pose is a pose that enables the vertebral screw to be secured to a spinal rod.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

It is to be appreciated that any feature described herein can be claimed in combination with any other feature(s) as described herein, regardless of whether the features come from the same described embodiment.

The details of one or more aspects of the disclosure are set forth in the accompanying drawings and the description below. Other features, objects, and advantages of the techniques described in this disclosure will be apparent from the description and drawings, and from the claims.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages of the present invention will become apparent to those skilled in the art upon consideration of the embodiment descriptions provided hereinbelow.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

It should be understood that various aspects disclosed herein may be combined in different combinations than the combinations specifically presented in the description and accompanying drawings. It should also be understood that, depending on the example or embodiment, certain acts or events of any of the processes or methods described herein may be performed in a different sequence, and/or may be added, merged, or left out altogether (e.g., all described acts or events may not be necessary to carry out the disclosed techniques according to different embodiments of the present disclosure). In addition, while certain aspects of this disclosure are described as being performed by a single module or unit for purposes of clarity, it should be understood that the techniques of this disclosure may be performed by a combination of units or modules associated with, for example, a computing device and/or a medical device.

In one or more examples, the described methods, processes, and techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors (e.g., Intel Core i3, i5, i7, or i9 processors; Intel Celeron processors; Intel Xeon processors; Intel Pentium processors; AMD Ryzen processors; AMD Athlon processors; AMD Phenom processors; Apple A10 or 10X Fusion processors; Apple A11, A12, A12X, A12Z, or A13 Bionic processors; or any other general purpose microprocessors), graphics processing units (e.g., Nvidia GeForce RTX 2000-series processors, Nvidia GeForce RTX 3000-series processors, AMD Radeon RX 5000-series processors, AMD Radeon RX 6000-series processors, or any other graphics processing units), application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The purpose of many surgical procedures, particularly those involving the spine, is to align the patient's anatomy/spine from a current state to (or closer to) a target alignment. In spinal procedures, the large-scale alignment may require a long incision (e.g., an open case). Two anchoring points, for example in the form of screws or hooks, may be inserted into each vertebra, and these anchoring points may then be manipulated to secure the anchoring points to a rod and thus achieve the desired alignment. This work, however, is manual labor (which can require significant exertion) and does not involve any specific force measurements. Consequently, such procedures result occasionally in either broken fixation points (typically pedicles) or under/over spine manipulation (e.g., not reaching, or exceeding, the target alignment). Moreover, this part of the procedure is very lengthy, requires a very high proficiency and in many cases results in far less correction than desired and assumed.

According to embodiments of the present disclosure, a surgeon plans her or his desired procedure and spine correction. This may include calculating a spine range of motion and estimating the maximum force that may be applied without inadvertently breaking any pedicles or other anatomical features. The necessary incisions, registration (e.g., between a robotic coordinate space and a patient coordinate space) and screw/hooks insertions are then performed. One (or more) robotic arms hold a spinal fixation rod in a desired pose. The one or more robotic arms may hold a certain part of the rod in some instances, especially if the rod is long (e.g., is intended to span more than three vertebral levels). Additionally, one (or more) other robotic arms grab the patient spine, linking to its fixation points (i.e. screws or hooks implanted in the vertebrae) and manipulates the spine to the desired rod (typically would be a little bit at a time). During manipulation of the spine by the one or more robotic arms, forces are measured to never exceed a predetermined force threshold, and the spine pose may be tracked (e.g. using segmental tracking). Tracking the spine pose allows, for example, a current spine pose to be compared to a target spine pose, which facilitates a determination of the progress of the surgery, a determination as to how much additional movement is needed (whether on a per-vertebra basis or on a whole-spine basis, or both), and a determination as to whether and when the target spine pose has been achieved).

As vertebral screws or hooks are brought into engagement with the rod (due to manipulation of the screws or hooks and/or the vertebra into which the screws or hooks are implanted), one of the robotic arms may close a set screw to secure each screw or hook to the rod, or may otherwise secure the screws or hooks to the rod so as to maintain the gained motion.

After each incremental movement of the spine (and/or one or more vertebrae thereof), the next step for the spine alignment is calculated based on what was done (as determined from the location and force measurements). Calculating the next step may include, for example, identifying one or more vertebrae to move next and/or determining a path and/or distance (linear and/or angular) of movement. The calculating may take into account an expected amount of force required to achieve any given movement, a range of motion of one or more vertebrae, a force threshold beyond which a given vertebra or other anatomical element may undesirably break, and/or any other available information corresponding, for example, to the patient's spine and/or elements thereof, and/or to a surgical plan that shows the target spine pose or other planned alignment.

Any one or more of the foregoing steps may be repeated as necessary until the planned spine alignment—or, if the forces required to move the spine to the planned spine alignment exceed a threshold beyond which undesirable breakage of one or more elements of the spine is likely, the maximum possible spine alignment—has been achieved.

Embodiments of the present disclosure beneficially reduce the amount of time that a patient and all attending medical personnel and/or operating room staff must be in the operating room, with a corresponding decrease in the cost of the procedure; improve efficiency; reduce fatigue; and reduce the possibility of pedicle breaking and under-correction outcomes that, using manual methods, are currently very common. In short, embodiments of the present disclosure positively improve patient outcomes.

Embodiments of the present disclosure provide technical solutions to one or more of the problems of (1) ensuring that a spine or other anatomical element reaches a target pose or alignment (or is moved as close as possible to such target pose or alignment) during surgery, and thus avoiding unintended under- or over-correction of the anatomical element's pose or alignment; (2) measuring a force exerted on a spine or other anatomical element during manipulation thereof to avoid unintended breakage of the anatomical element; (3) reducing the amount of time necessary to complete surgical procedures, with consequent reductions in the cost of the procedure, the amount of anesthesia and other medicines or chemicals required during the procedure, and the amount of radiation exposure (for procedures that involve radiation) to the patient and the operating room staff; and (4) enabling autonomous completion of robotic surgeries intended to correct a pose or alignment of an anatomical element.

Figure 1:
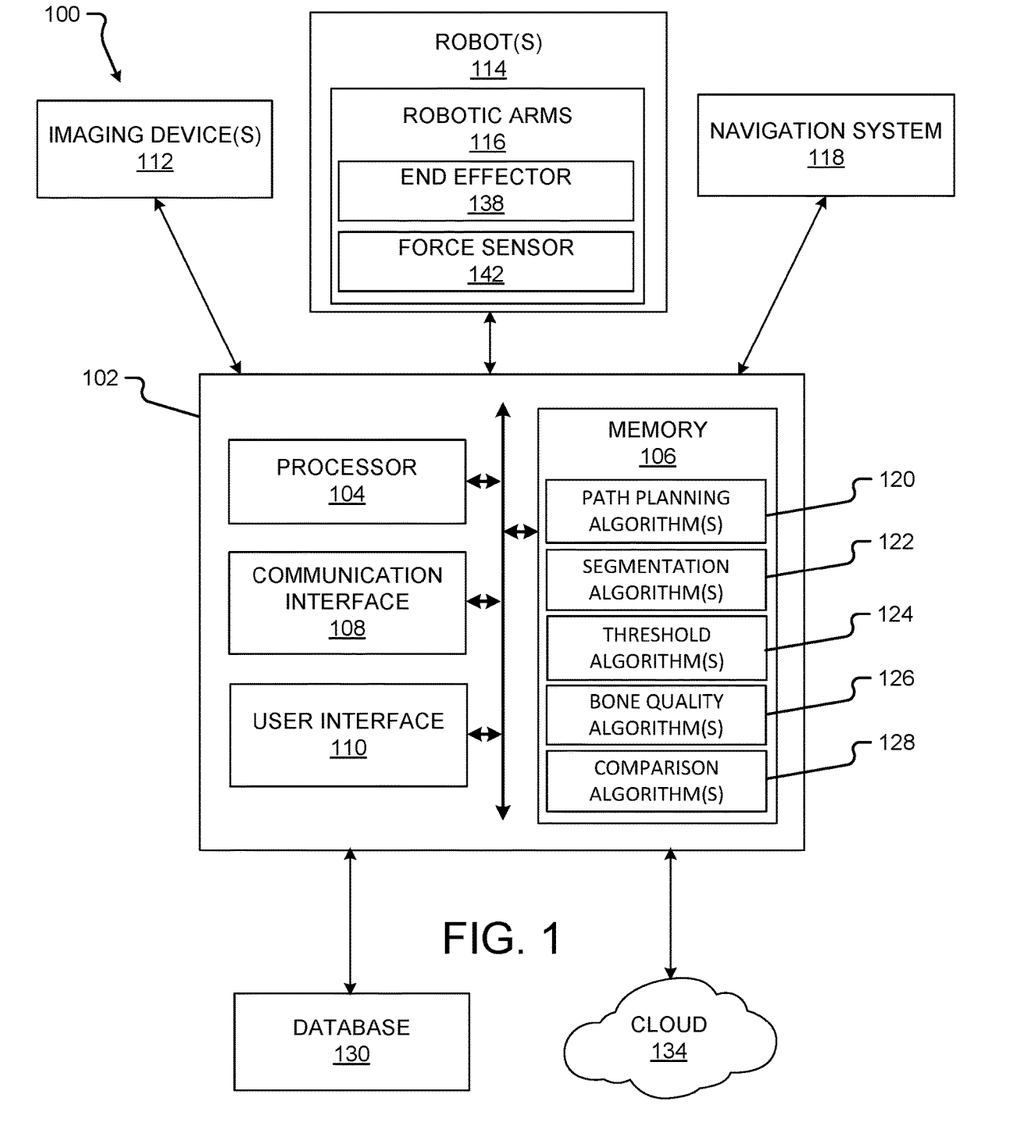
FIG. 1 is a block diagram of a system according to at least one embodiment of the present disclosure.

Turning first to FIG. 1, a block diagram of a system 100 according to at least one embodiment of the present disclosure is shown. The system 100 may be used to assist with or autonomously complete a surgical procedure that involves manipulation of a pose or alignment of a spine or other anatomical element, and/or to carry out one or more other aspects of one or more of the methods disclosed herein. The system 100 comprises a computing device 102, one or more imaging devices 112, at least one robot 114, a navigation system 118, a database 130, and/or a cloud or other network 134. Systems according to other embodiments of the present disclosure may comprise more or fewer components than the system 100. For example, the system 100 may not include the imaging device 112, the navigation system 118, one or more components of the computing device 102, the database 130, and/or the cloud 134.

The computing device 102 comprises a processor 104, a memory 106, a communication interface 108, and a user interface 110. Computing devices according to other embodiments of the present disclosure may comprise more or fewer components than the computing device 102.

The processor 104 of the computing device 102 may be any processor described herein or any similar processor. The processor 104 may be configured to execute instructions stored in the memory 106, which instructions may cause the processor 104 to carry out one or more computing steps utilizing or based on data received from the imaging device 112, the robot 114, the navigation system 118, the database 130, and/or the cloud 134.

The memory 106 may be or comprise RAM, DRAM, SDRAM, other solid-state memory, any memory described herein, or any other tangible, non-transitory memory for storing computer-readable data and/or instructions. The memory 106 may store information or data useful for completing, for example, any step of the methods 200, 300, 400, 500, 600, 700, and/or 800 described herein, or of any other methods. The memory 106 may store, for example, one or more path planning algorithms 120, one or more segmentation algorithms 122, one or more threshold algorithms 124, one or more bone quality algorithms 126, and/or one or more comparison algorithms 128. Such instructions or algorithms may, in some embodiments, be organized into one or more applications, modules, packages, layers, or engines. The algorithms and/or instructions may cause the processor 104 to manipulate data stored in the memory 106 and/or received from or via the imaging device 112, the robot 114, the database 130, and/or the cloud 134.

The computing device 102 may also comprise a communication interface 108. The communication interface 108 may be used for receiving image data or other information from an external source (such as the imaging device 112, the robot 114, the navigation system 118, the database 130, the cloud 134, and/or any other system or component not part of the system 100), and/or for transmitting instructions, images, or other information to an external system or device (e.g., another computing device 102, the imaging device 112, the robot 114, the navigation system 118, the database 130, the cloud 134, and/or any other system or component not part of the system 100). The communication interface 108 may comprise one or more wired interfaces (e.g., a USB port, an ethernet port, a Firewire port) and/or one or more wireless transceivers or interfaces (configured, for example, to transmit and/or receive information via one or more wireless communication protocols such as 802.11a/b/g/n, Bluetooth, NFC, ZigBee, and so forth). In some embodiments, the communication interface 108 may be useful for enabling the device 102 to communicate with one or more other processors 104 or computing devices 102, whether to reduce the time needed to accomplish a computing-intensive task or for any other reason.

The computing device 102 may also comprise one or more user interfaces 110. The user interface 110 may be or comprise a keyboard, mouse, trackball, monitor, television, screen, touchscreen, and/or any other device for receiving information from a user and/or for providing information to a user. The user interface 110 may be used, for example, to receive a user selection or other user input regarding any step of any method described herein. Notwithstanding the foregoing, any required input for any step of any method described herein may be generated automatically by the system 100 (e.g., by the processor 104 or another component of the system 100) or received by the system 100 from a source external to the system 100. In some embodiments, the user interface 110 may be useful to allow a surgeon or other user to modify instructions to be executed by the processor 104 according to one or more embodiments of the present disclosure, and/or to modify or adjust a setting of other information displayed on the user interface 110 or corresponding thereto.

Although the user interface 110 is shown as part of the computing device 102, in some embodiments, the computing device 102 may utilize a user interface 110 that is housed separately from one or more remaining components of the computing device 102. In some embodiments, the user interface 110 may be located proximate one or more other components of the computing device 102, while in other embodiments, the user interface 110 may be located remotely from one or more other components of the computer device 102.

The imaging device 112 may be operable to image anatomical feature(s) (e.g., a bone, veins, tissue, etc.), surgical implants, and/or other aspects of patient anatomy to yield image data (e.g., image data depicting or corresponding to a bone, veins, tissue, implanted devices, etc.). "Image data" as used herein refers to the data generated or captured by an imaging device 112, including in a machine-readable form, a graphical/visual form, and in any other form. In various examples, the image data may comprise data corresponding to an anatomical feature of a patient, or to a portion thereof. The image data may be or comprise a preoperative image, an intraoperative image, a postoperative image, or an image taken independently of any surgical procedure. In some embodiments, a first imaging device 112 may be used to obtain first image data (e.g., a first image) at a first time, and a second imaging device 112 may be used to obtain second image data (e.g., a second image) at a second time after the first time. The imaging device 112 may be capable of taking a 2D image or a 3D image to yield the image data. The imaging device 112 may be or comprise, for example, an ultrasound scanner (which may comprise, for example, a physically separate transducer and receiver, or a single ultrasound transceiver), an O-arm, a C-arm, a G-arm, or any other device utilizing X-ray-based imaging (e.g., a fluoroscope, a CT scanner, or other X-ray machine), a magnetic resonance imaging (MRI) scanner, an optical coherence tomography (OCT) scanner, an endoscope, a microscope, a thermographic camera (e.g., an infrared camera), a radar system (which may comprise, for example, a transmitter, a receiver, a processor, and one or more antennae), or any other imaging device 112 suitable for obtaining images of an anatomical feature of a patient. The imaging device 112 may be contained entirely within a single housing, or may comprise a transmitter/emitter and a receiver/detector that are in separate housings or are otherwise physically separated.

In some embodiments, the imaging device 112 may comprise more than one imaging device 112. For example, a first imaging device may provide first image data and/or a first image, and a second imaging device may provide second image data and/or a second image. In still other embodiments, the same imaging device may be used to provide both the first image data and the second image data, and/or any other image data described herein. The imaging device 112 may be operable to generate a stream of image data. For example, the imaging device 112 may be configured to operate with an open shutter, or with a shutter that continuously alternates between open and shut so as to capture successive images. For purposes of the present disclosure, unless specified otherwise, image data may be considered to be continuous and/or provided as an image data stream if the image data represents two or more frames per second.

The robot 114 may be any surgical robot or surgical robotic system. The robot 114 may be or comprise, for example, the Mazor X™ Stealth Edition robotic guidance system. The robot 114 comprises one or more robotic arms 116, each of which may be configured to position an imaging device 112, an end effector 138 (which may be any interface that enables the robotic arm to hold, support, control, and/or manipulate a tool, implant, anatomical element, or other object, or otherwise to perform a desired task), or any other device or tool (including a device or tool held by the end effector 138) at one or more precise position(s) and orientation(s), and/or to return the object to the same position(s) and orientation(s) at a later point in time. The robot 114 may additionally or alternatively be configured to manipulate a surgical tool (whether based on guidance from the navigation system 118 or not) to accomplish or to assist with a surgical task. In some embodiments, one or more robotic arms 116 of the robot 114 may be configured to hold and/or manipulate an anatomical element during or in connection with a surgical procedure. In some embodiments, the robotic arm 116 may comprise a first robotic arm and a second robotic arm, though the robot 114 may comprise more than two robotic arms 116. In some embodiments, one or more of the robotic arms 116 may be used to hold and/or maneuver the imaging device 112. In embodiments where the imaging device 112 comprises two or more physically separate components (e.g., a transmitter and receiver), one robotic arm 116 may hold one such component, and another robotic arm 116 may hold another such component. Also in some embodiments, a first robotic arm 116 may be used to hold a first tool, implant, or anatomical element, and a second robotic arm 116 may be used to hold a second tool, implant, or anatomical element. The first and second robotic arms may then be controlled to manipulate one or both of the first and/or second tool, implant, or anatomical element to adjust a pose of one relative to the other. Each robotic arm 116 may be positionable independently of the other robotic arm. The robotic arms may be controlled in a single, shared coordinate space, or in separate coordinate spaces.

The robot 114, together with the robotic arms 116, may have, for example, one, two, three, four, five, six, seven, or more degrees of freedom. Further, the robotic arm 116 may be positioned or positionable in any pose, plane, and/or focal point. The pose includes a position and an orientation. As a result, an imaging device 112, surgical tool, or other object held by the robot 114 (or, more specifically, by a robotic arm 116) may be precisely positionable in one or more needed and specific positions and orientations.

The robotic arms 116 may comprise a force sensor 142 for detecting a force exerted by the robotic arm 116 on an object (or, in some embodiments, for detecting a force exerted by an object on the robotic arm 116). The force sensor may be or comprise a hydraulic, pneumatic, piezoelectric, and/or capacitive load cell. The force sensor may also be or comprise a load cell based on a strain gage. The robotic arms 116 may additionally or alternatively comprise one or more sensors that enable the processor 104 (or a processor of the robot 114) to determine a precise pose in space of the robotic arms 116 (as well as any object or element held by or secured to the robotic arms 116).

In some embodiments, reference markers (i.e., navigation markers) may be placed on the robot 114 (including, e.g., on the robotic arm 116), the imaging device 112, or any other object in the surgical space. The reference markers may be tracked by the navigation system 118, and the results of the tracking may be used by the robot 114 and/or by an operator of the system 100 or any component thereof. In some embodiments, the navigation system 118 can be used to track other components of the system (e.g., imaging device 112) and the system can operate without the use of the robot 114 (e.g., with the surgeon manually manipulating the imaging device 112 and/or one or more surgical tools, based on information and/or instructions generated by the navigation system 118, for example).

The navigation system 118 may provide navigation for a surgeon and/or a surgical robot during an operation. The navigation system 118 may be any now-known or future-developed navigation system, including, for example, the Medtronic StealthStation™ S8 surgical navigation system or any successor thereof. The navigation system 118 may include one or more cameras or other sensor(s) for tracking one or more reference markers, navigated trackers, or other objects within the operating room or other room in which some or all of the system 100 is located. The one or more cameras may be optical cameras, infrared cameras, or other cameras. In some embodiments, the navigation system may comprise one or more electromagnetic sensors. In various embodiments, the navigation system 118 may be used to track a position and orientation (i.e., pose) of the imaging device 112, the robot 114 and/or robotic arm 116, and/or one or more surgical tools (or, more particularly, to track a pose of a navigated tracker attached, directly or indirectly, in fixed relation to the one or more of the foregoing). The navigation system 118 may include a display for displaying one or more images from an external source (e.g., the computing device 102, imaging device 112, or other source) or for displaying an image and/or video stream from the one or more cameras or other sensors of the navigation system 118. In some embodiments, the system 100 can operate without the use of the navigation system 118. The navigation system 118 may be configured to provide guidance to a surgeon or other user of the system 100 or a component thereof, to the robot 114, or to any other element of the system 100 regarding, for example, a pose of one or more anatomical elements, whether or not a tool is in the proper trajectory, and/or how to move a tool into the proper trajectory to carry out a surgical task according to a preoperative or other surgical plan.

The system 100 or similar systems may be used, for example, to carry out one or more aspects of any of the methods 200, 300, 400, 500, 600, 700 and/or 800 described herein. The system 100 or similar systems may also be used for other purposes.

Figure 2:
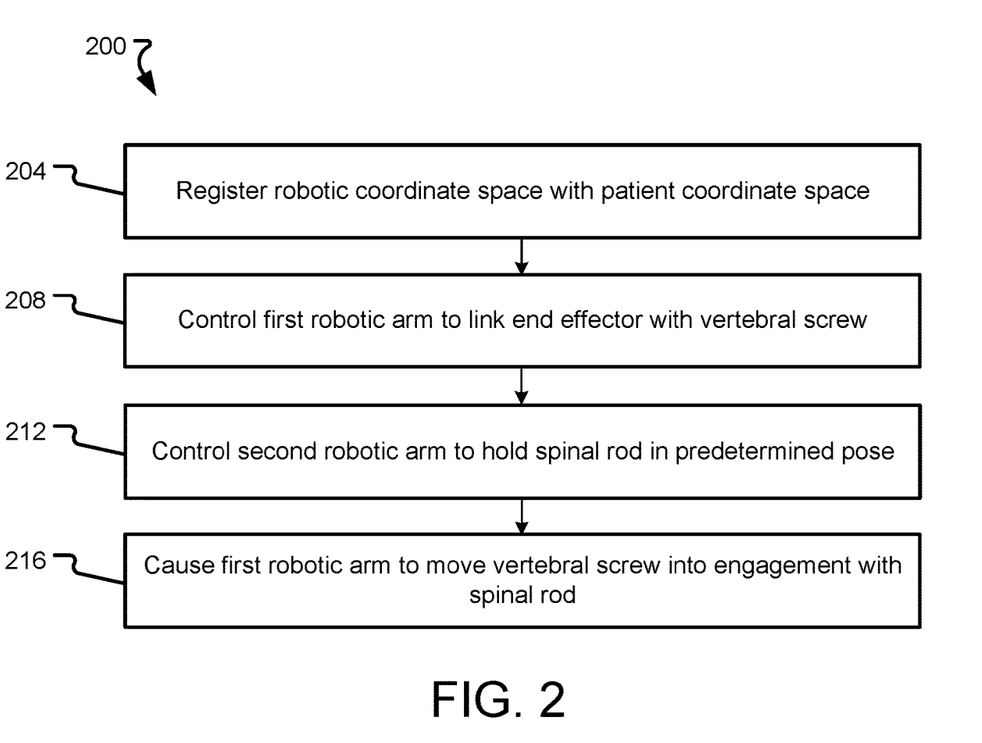
FIG. 2 is a flowchart according to at least one embodiment of the present disclosure.

FIG. 2 depicts a method 200 that may be used, for example, to manipulate a spine of a patient into a desired pose.

The method 200 (and/or one or more steps thereof) may be carried out or otherwise performed, for example, by at least one processor. The at least one processor may be the same as or similar to the processor(s) 104 of the computing device 102 described above. The at least one processor may be part of a robot (such as a robot 114) or part of a navigation system (such as a navigation system 118). A processor other than any processor described herein may also be used to execute the method 200. The at least one processor may perform the method 200 by executing instructions stored in a memory such as the memory 106. The instructions may correspond to one or more steps of the method 200 described below. The instructions may cause the processor to execute one or more algorithms, such as a path planning algorithm 120, a segmentation algorithm 122, a threshold algorithm 124, a bone quality algorithm 126, and/or a comparison algorithm 128.

The method 200 comprises registering a robotic coordinate space with a patient coordinate space (step 204). The robotic coordinate space represents a coordinate space relative to which one or more robotic arms (e.g., the robotic arms 116 of the robot 114) are controlled, and the patient coordinate space represents a coordinate space through which any particular location of the patient's anatomy may be defined. Registering the robotic coordinate space with the patient coordinate space enables the robotic arms to be caused to move to any specific pose, position, or orientation relative to the patient.

The registering may be completed in any known manner. In some embodiments, the registering may comprise obtaining one or more images (using, for example, an imaging device 112) that depict both a fiducial marker or other object affixed to a known (relative to a patient coordinate space) location on the patient, and some or all of one or more of the robotic arms (and/or of a fiducial marker or other object affixed to the one or more robotic arms at a known location). The one or more images may then be analyzed to determine a pose (position and orientation) of the robotic arm relative to the patient. This information, combined with information from the robot about the pose of the robotic arm in the robotic coordinate space at the moment(s) the one or more images were taken, may then be used to map or otherwise correlate the patient coordinate space to the robotic coordinate space. In other embodiments, the registering may comprise registering each of the robotic coordinate space and the patient coordinate space with a navigation coordinate space (corresponding, for example, to a navigation system 118), and then using those registrations either to translate patient coordinate space coordinates to robotic coordinate space coordinates (via navigation coordinate space coordinates) or vice versa, or to develop a direct registration between the robotic coordinate space and the patient coordinate space.

The method 200 also comprises controlling a first robotic arm to link an end effector of the first robotic arm with a vertebral screw or other implanted fixation point (step 208). The first robotic arm may be, for example, a robotic arm 116 of a robot 114. The end effector may be, for example, an end effector 138. The vertebral screw may be any kind of screw that has been implanted in a vertebra of the patient (e.g., a pedicle screw). In some embodiments, a hook or other vertebral implant other than a vertebral screw may be used instead of a vertebral screw. The end effector may be specifically selected and/or configured to grasp the vertebral screw, or the end effector may comprise a generic grip or other interface capable and/or configured to grasp multiple varieties of vertebral screws, hooks, and/or other implants.

In some embodiments, the step 208 may comprise causing the first robotic arm to maneuver in a particular manner so that the end effector receives the vertebral screw (or, more specifically, a head of or tulip attached to the vertebral screw) in a slot, receptacle, aperture, or other linking feature thereof. In these and/or in other embodiments, the end effector may be controllable, and the step 208 may comprise causing the first robotic arm to maneuver in a particular manner so that the end effector can be controlled to grasp or otherwise actively secure itself to the vertebral screw. Notwithstanding the foregoing examples, the first robotic arm may be caused to link an end effector thereof with a vertebral screw or other implanted fixation point in any manner that enables the step 216 of the method 200 to be performed.

The vertebral screw to which the first robotic arm's end effector links in the step 208 may be a vertebral screw that will be attached closest to a proximal end of a spinal rod than any other vertebral screw in some embodiments, or closest to a distal end of a spinal rod than any other vertebral screw in other embodiments. The particular vertebral screw may be defined by a preoperative plan, which may specifically define an order of attachment of a plurality of vertebral screws to a spinal rod. The order may be determined, for example, to minimize one or more of a maximum force that will need to be applied to each vertebral body (via a vertebral screw implanted therein) during attachment of the vertebral screw to a spinal rod; to minimize a total amount of force that will be applied to the spine during attachment of a plurality of vertebral screws to a spinal rod; to ensure that no vertebral body is moved beyond its existing range of motion; and/or to ensure that no one vertebral body and/or vertebral screw becomes an obstacle to movement of a robotic arm (or otherwise) so as to prevent another vertebral screw from being attached to the spinal rod.

A preoperative plan as described above may be received by a processor such as the processor 104 from and/or via a database 130, a network such as the cloud 134, a memory 106, a user interface 110, and/or a communication interface 108. In some embodiments, one or more aspects of the preoperative plan (including, for example, a prescribed order of attachment of a plurality of vertebral screws to a spinal rod) may be generated automatically, whether using artificial intelligence (e.g., machine learning, a neural network, etc.) or otherwise. In such embodiments, the automatically generated surgical plan or portion thereof may be presented to a surgeon or other user for modification and/or acceptance thereof.

The method 200 also comprises controlling a second robotic arm, different than the first robotic arm, to hold a spinal rod in a predetermined pose (step 212). The second robotic arm may be a robotic arm 116, for example, or any other robotic arm. The second robotic arm may hold the spinal rod using an end effector such as the end effector 138. The second robotic arm is controlled in the same robotic coordinate space as the first robotic arm, although in some embodiments the second robotic arm may be controlled in a separate coordinate space than the first robotic arm (although in such embodiments, the coordinate space of the first robotic arm is registered to the coordinate space of the second robotic arm or vice versa). The spinal rod may be any spinal fixation rod intended to be attached to a plurality of vertebral screws to assist in maintaining a particular alignment of the patient's spine. The spinal rod may be made, for example, of titanium or any other biocompatible material having sufficient strength to withstand the forces imposed thereon following fixation of the rod to the patient's spine. The spinal rod may be straight, or may be bent into a particular shape configured to impart a desired alignment to the patient's spine.

The second robotic arm may hold the rod at a proximal end thereof, a distal end thereof, or any point therebetween. In some embodiments, the second robotic arm may hold the rod at multiple locations, whether to provide greater stability to the rod, to prevent inadvertent bending of the rod, or for any other reason. The second robotic arm may be configured to selectively grasp the rod at one or more locations while simultaneously releasing the rod at one or more other locations, so as to facilitate the connecting of vertebral screws to the rod. An end effector such as the end effector 138 may be provided on the second robotic arm to enable one or more aspects of the foregoing functionality (and/or any other required functionality of the second robotic arm).

The second robotic arm is controlled to hold the spinal rod in a predetermined pose. In some embodiments, the predetermined pose may be an expected final pose of the rod. In other embodiments, the predetermined pose may be a pose calculated or otherwise determined to facilitate connection of one or more vertebral screws to the rod. In some embodiments, the second robotic arm may hold the rod in a first predetermined pose to facilitate attachment of a first vertebral screw thereto, after which the second robotic arm may move the rod to a second predetermined pose to facilitate attachment of a second vertebral screw thereto, and so on until the rod has been secured to all intended vertebral screws. The predetermined pose may be described or otherwise provided in a surgical plan, or the predetermined pose may be calculated by a processor (which may be, for example, any processor disclosed and/or described herein).

During attachment of one or more vertebral screws to the rod, the second robotic arm may be controlled to hold the rod at two or more different positions along the length of the rod, and/or at two or more different rotational positions of the rod. In some embodiments, for example, the second robotic arm (including, for example, the second robotic arm's end effector) may be controlled to hold the rod at a first rotational position during attachment of one or more vertebral screws to the rod, and to then rotate the rod to a second rotational position thereafter. Also in some embodiments, the second robotic arm (including, for example, the second robotic arm's end effector) may be controlled to slide along a length of the rod from one linear position on the rod to another linear position on the rod to better facilitate attachment of one or more vertebral screws thereto.

The method 200 also comprises causing the first robotic arm to move the vertebral screw into engagement with the spinal rod (step 216). With the second robotic arm holding the rod in a predetermined pose, the first robotic arm (which has an end effector that is linked with a vertebral screw) may be caused to move the vertebral screw (and therefore the vertebra in which the vertebral screw is implanted) into engagement with the rod. The movement may comprise lateral movement; anterior/posterior movement; movement that brings a head of each of a plurality of vertebral screws closer together; and/or movement that expands a distance between the heads of a plurality of vertebral screws. The step 216 may comprise calculating a path along which to move the vertebral screw to bring the vertebral screw into alignment with the rod. The path may be calculated, for example, using a path planning algorithm 120 or any other algorithm. In calculating or otherwise determining the path, information such as a pose of the rod, a pose of the second robotic arm, and a pose of any other potential obstacles (whether surgical tools, anatomical elements, or other objects) may be taken into account. Additionally, the path determination may take into account information about, for example, motion limits of the vertebra into which the vertebral screw is implanted; whether the first robotic arm will need to exert a force on the vertebral screw, and thus on the vertebra in which the vertebral screw is implanted, that will exceed a predetermined force threshold; and any other relevant information.

The first robotic arm may be caused to move the vertebral screw into engagement with the spinal rod in one continuous motion, or in increments. Where the motion is continuous, the first robotic arm may be caused to move the vertebral screw into engagement with the spinal rod slowly enough to allow forces exerted on the vertebral screw (and thus on the vertebra) to be calculated and compared to a predetermined force threshold.

The step 216 may comprise one or more of causing the vertebral screw to move along a linear path or a curved path. The step 216 may also comprise causing some degree of angular rotation of the vertebral screw around one or more axes. In some embodiments, the step 216 may further comprise causing the second robotic arm to move the rod in a coordinated fashion to facilitate bringing the vertebral screw into engagement with the rod.

In some embodiments, the vertebral screw comprises a head or tulip that engages the rod. In other embodiments, the vertebral screw may engage the rod using one or more features other than a head or a tulip. Once the vertebral screw is engaged with the rod, a set screw or other locking means may be used to lock the rod onto the vertebral screw, or vice versa.

The present disclosure encompasses embodiments of the method 200 that comprise more or fewer steps than those described above, and/or one or more steps that are different than the steps described above.

Figure 3:
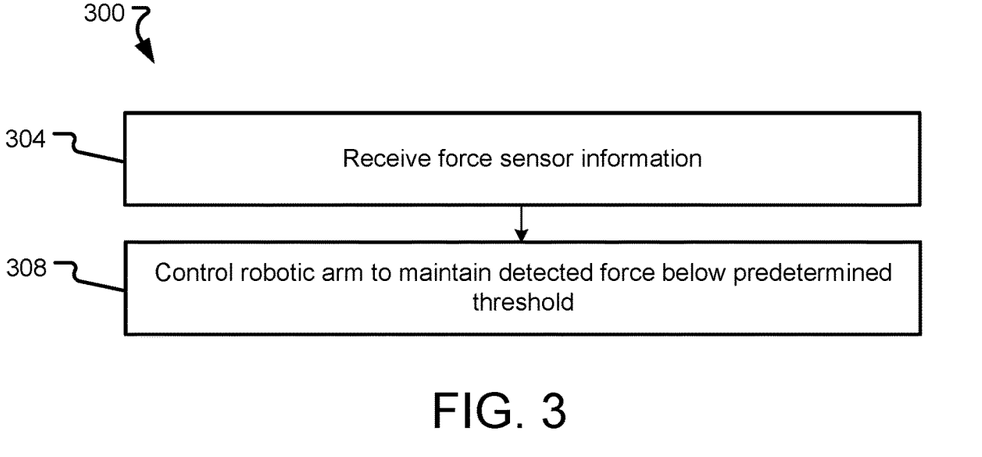
FIG. 3 is a flowchart according to at least one embodiment of the present disclosure.

FIG. 3 depicts a method 300 that may be used, for example, to ensure that a robotic arm (e.g., a robotic arm 116) does not exceed a force threshold while manipulating an anatomical element. The method 300 may be used, for example, in combination with the method 200, or in combination with any other method (or any aspect of any method) disclosed herein.

The method 300 (and/or one or more steps thereof) may be carried out or otherwise performed, for example, by at least one processor. The at least one processor may be the same as or similar to the processor(s) 104 of the computing device 102 described above. The at least one processor may be part of a robot (such as a robot 114) or part of a navigation system (such as a navigation system 118). A processor other than any processor described herein may also be used to execute the method 300. The at least one processor may perform the method 300 by executing instructions stored in a memory such as the memory 106. The instructions may correspond to one or more steps of the method 300 described below. The instructions may cause the processor to execute one or more algorithms, such as a path planning algorithm 120, a segmentation algorithm 122, a threshold algorithm 124, a bone quality algorithm 126, and/or a comparison algorithm 128.

The method 300 comprises receiving force sensor information (step 304). The force sensor information may be received, for example, from a force sensor such as the force sensor 142. The force sensor may be secured to the first robotic arm. The force sensor is configured to detect a force exerted by or on the first robotic arm, and more specifically enables determination of at least a magnitude of a force exerted by the first robotic arm on the vertebral screw (and thus on the vertebra into which the vertebral screw is implanted).

The method 300 also comprises controlling a robotic arm to maintain a detected force below a predetermined threshold (step 308). The step 308 may comprise constantly comparing a detected force (which may be a force magnitude determined based on the force sensor information) to a predetermined threshold, continuing to operate the first robotic arm normally when the detected force is below the predetermined threshold by at least a predetermined amount (e.g., 0%, 5%, 10%), slowing motion of the first robotic arm when the detected force approaches the predetermined threshold, and/or stopping motion of the first robotic when the first robotic arm reaches the predetermined threshold. In some embodiments, the step 308 may comprise reversing motion of the first robotic arm if the force magnitude exceeds the predetermined threshold.

The present disclosure encompasses embodiments of the method 300 that comprise more or fewer steps than those described above, and/or one or more steps that are different than the steps described above.

Figure 4:
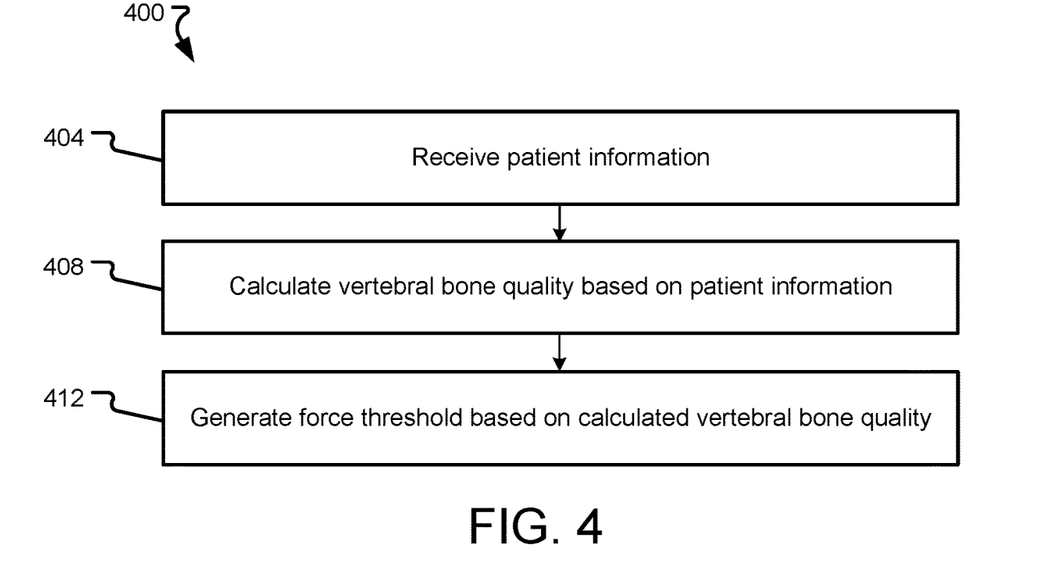
FIG. 4 is a flowchart according to at least one embodiment of the present disclosure.

FIG. 4 depicts a method 400 that may be used, for example, to determine a force threshold for use during manipulation of an anatomical element such as a spine. The method 400 may be used, for example, in combination with the method 200, the method 300, and/or in combination with any other method (or any aspect of any method) disclosed herein.

The method 400 (and/or one or more steps thereof) may be carried out or otherwise performed, for example, by at least one processor. The at least one processor may be the same as or similar to the processor(s) 104 of the computing device 102 described above. The at least one processor may be part of a robot (such as a robot 114) or part of a navigation system (such as a navigation system 118). A processor other than any processor described herein may also be used to execute the method 400. The at least one processor may perform the method 400 by executing instructions stored in a memory such as the memory 106. The instructions may correspond to one or more steps of the method 400 described below. The instructions may cause the processor to execute one or more algorithms, such as a path planning algorithm 120, a segmentation algorithm 122, a threshold algorithm 124, a bone quality algorithm 126, and/or a comparison algorithm 128.

The method 400 comprises receiving patient information (step 404). The patient information—which may be received, for example, from or via a database 130, a cloud 134, a memory 106, a user interface 110, and/or a communication interface 108—may be or comprise, for example, information about the patient's age, any diseases or other medical conditions of the patient, the patient's body mass index, and/or other information regarding characteristics that may affect the patient's bone quality.

The method 400 also comprises calculating vertebral bone quality based on the received patient information (step 408). The calculation may use, for example, a bone quality algorithm such as the algorithm 126 to calculate the bone quality. Any now-known or future-developed method of calculating bone quality may be used to determine the vertebral bone quality of the patient.

The method 400 also comprises generating a force threshold (to be used as a predetermined threshold) based on the calculated vertebral bone quality (step 412). The force threshold may be based solely on the calculated vertebral bone quality of the patient from the step 408, or the force threshold may additionally be based on factors such as a size of the bone in question, a depth to which a vertebral screw has been implanted therein, a length and/or diameter of the vertebral screw, a minimum width of the vertebral wall proximate the vertebral screw, and/or any other relevant information. The force threshold may be a value beyond which a risk of breakage of the vertebra becomes unacceptably high. In some embodiments, a 5% chance of breakage of the vertebra may be unacceptably high, while in other embodiments a 10%, 15%, 20%, 25%, 30%, 40%, 45%, 50%, 55%, 60%, 65%, 70%, 75%, 80%, 85%, 90%, or 95% chance of breakage of the vertebra may be unacceptably high. The force threshold may therefore be determined based in part on, for example, a surgeon preference as to what constitutes an unacceptably high risk of breakage, a patient preference as to what constitutes an unacceptably high risk of breakage, a standard of care as to what constitutes an unacceptably high risk of breakage, or any other input regarding what risk of breakage is or is not acceptable.

The present disclosure encompasses embodiments of the method 400 that comprise more or fewer steps than those described above, and/or one or more steps that are different than the steps described above.

Figure 5:
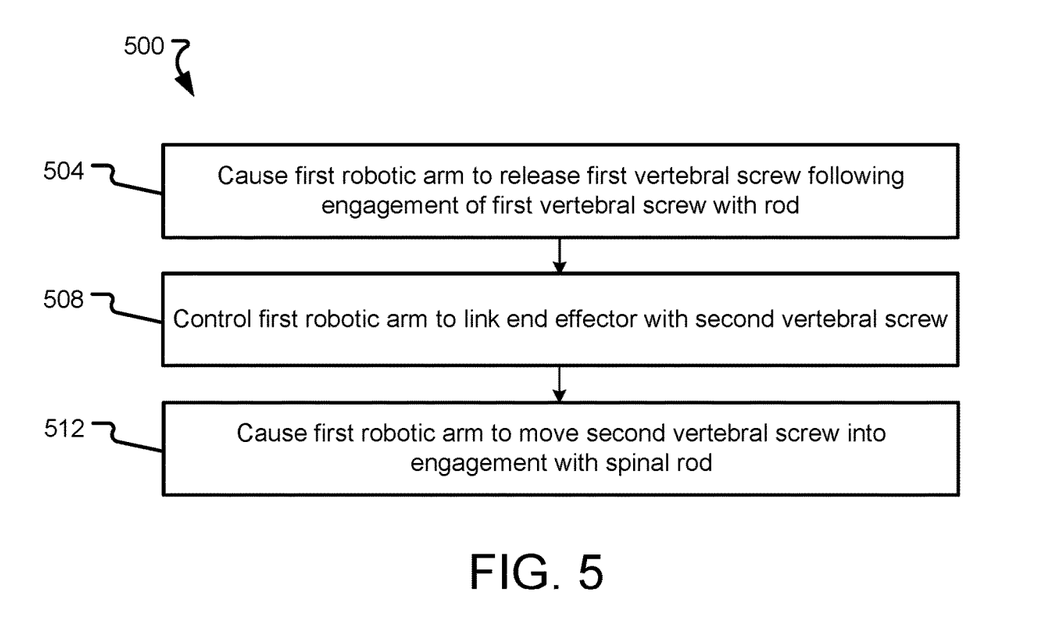
FIG. 5 is a flowchart according to at least one embodiment of the present disclosure.

FIG. 5 depicts a method 500 that may be used, for example, to robotically manipulate multiple segments of an anatomical element (e.g., multiple vertebrae of a spine). The method 500 may be used, for example, in combination with the method 200, the method 300, the method 400, and/or in combination with any other method (or any aspect of any method) disclosed herein.

The method 500 (and/or one or more steps thereof) may be carried out or otherwise performed, for example, by at least one processor. The at least one processor may be the same as or similar to the processor(s) 104 of the computing device 102 described above. The at least one processor may be part of a robot (such as a robot 114) or part of a navigation system (such as a navigation system 118). A processor other than any processor described herein may also be used to execute the method 500. The at least one processor may perform the method 500 by executing instructions stored in a memory such as the memory 106. The instructions may correspond to one or more steps of the method 500 described below. The instructions may cause the processor to execute one or more algorithms, such as a path planning algorithm 120, a segmentation algorithm 122, a threshold algorithm 124, a bone quality algorithm 126, and/or a comparison algorithm 128.

The method 500 comprises causing a first robotic arm to release a first vertebral screw following engagement of the first vertebral screw with a spinal rod (step 504). For example, once the step 216 of the method 200 has been completed, the step 504 of the method 500 may occur. The step 504 may constitute an opposite motion or action than the motion or action undertaken in the step 208. Thus, for example, if the step 208 comprised grasping a first vertebral screw, then the step 504 may comprise releasing the first vertebral screw. If the step 208 comprised moving the first robotic arm so as to cause the first vertebral screw to be received in a receptacle of an end effector of the first robotic arm, then the step 504 may comprise moving the first robotic arm so as to cause the first vertebral screw to exit the receptacle of the end effector. The result of the step 504 is that the first robotic arm is available to engage a second vertebral screw different than the first vertebral screw.

In some embodiments of the present disclosure, a single end effector affixed to a first robotic arm as described herein may be capable of grasping and controlling (whether collectively or individually) multiple vertebral screws simultaneously. In such embodiments, the first vertebral screw may not need to be released in order to grasp a second vertebral screw, although a first set of vertebral screws may be released once engaged to the rod so that a second set of vertebral screws may be grasped and moved into engagement with the rod.

The method 500 also comprises controlling the first robotic arm to link an end effector attached to the first robotic arm with a second vertebral screw (step 508). The step 508 may be the same as or similar to the step 208 of the method 200, except that the end effector is being linked with the second vertebral screw instead of the first vertebral screw.

The method 500 also comprises causing the first robotic arm to move the second vertebral screw into engagement with the spinal rod (step 512). The step 512 may be the same as or similar to the step 216 of the method 200, except that the first robotic arm is being caused to move the second vertebral screw, rather than the first vertebral screw, into engagement with the spinal rod. As noted above with respect to the step 216, in some embodiments the second robotic arm may adjust a pose of the spinal rod in connection with the step 512, so as to facilitate bringing the second vertebral screw into engagement with the spinal rod.

The present disclosure encompasses embodiments of the method 500 that comprise more or fewer steps than those described above, and/or one or more steps that are different than the steps described above.

Figure 6:
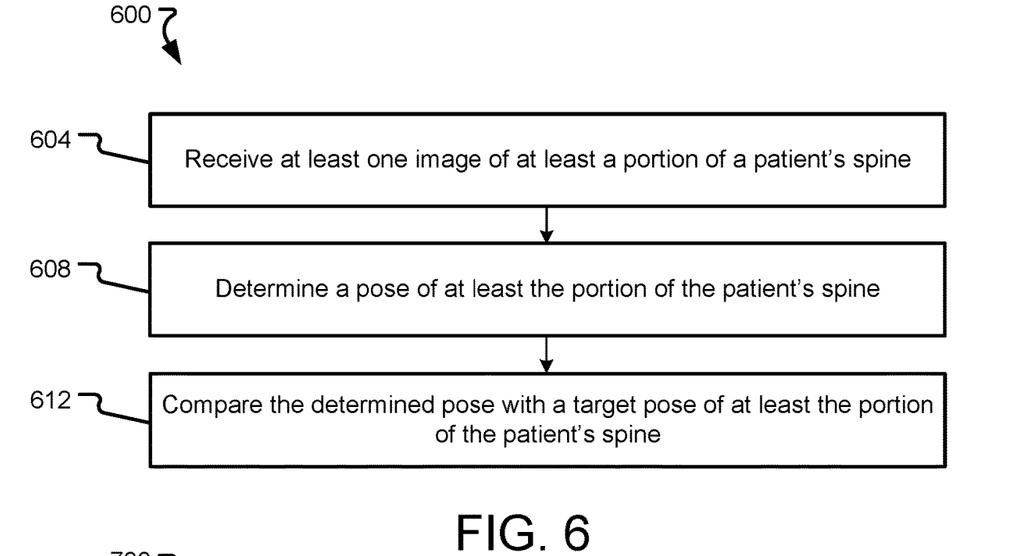
FIG. 6 is a flowchart according to at least one embodiment of the present disclosure.

FIG. 6 depicts a method 600 that may be used, for example, to monitor a pose of an anatomical element relative to a target pose of the anatomical element. The method 600 may be used, for example, in combination with the method 200, the method 300, the method 400, the method 500, and/or in combination with any other method (or any aspect of any method) disclosed herein.

The method 600 (and/or one or more steps thereof) may be carried out or otherwise performed, for example, by at least one processor. The at least one processor may be the same as or similar to the processor(s) 104 of the computing device 102 described above. The at least one processor may be part of a robot (such as a robot 114) or part of a navigation system (such as a navigation system 118). A processor other than any processor described herein may also be used to execute the method 600. The at least one processor may perform the method 600 by executing instructions stored in a memory such as the memory 106. The instructions may correspond to one or more steps of the method 600 described below. The instructions may cause the processor to execute one or more algorithms, such as a path planning algorithm 120, a segmentation algorithm 122, a threshold algorithm 124, a bone quality algorithm 126, and/or a comparison algorithm 128.

The method 600 comprises receiving at least one image of at least a portion of a patient's spine (step 604). The at least one image may be an X-ray image, an ultrasound image, or any other image that depicts a portion of the patient's spine. The at least one image may be a three-dimensional image, or a two-dimensional image. The at least one image may be captured and/or generated using an imaging device such as the imaging device 112. The imaging device may be an imaging device having a known pose, whether because the imaging device is supported by an accurate robotic arm (e.g., a robotic arm whose pose relative to a robotic coordinate system is always known), or because the imaging device comprises a tracking marker visible to a navigation system such as the navigation system 118, or because the imaging device is mounted in a known location, or otherwise.

The at least a portion of the patient's spine may be one or more vertebra of the patient's spine, or a portion of a vertebra of the patient's spine, or the entire spine. In some embodiments, the image depicts a portion of the patient's spine that is most relevant to the surgical procedure being undertaken. Thus, for example, if the surgical procedure is intended to adjust the lumbar spine, then the image may depict the lumbar spine. In the same example, the image may depict only a portion of the thoracic spine (e.g., a portion of the thoracic spine that is proximate the lumbar spine), and none of the cervical spine.

The method 600 also comprises determining a pose of at least the portion of the patient's spine (step 608). Determining the pose of at least the portion of the patient's spine may comprise segmenting the at least one image to identify and/or define the boundaries of each vertebra or portion thereof depicted in the one or more images. The segmentation may be accomplished using a segmentation algorithm 122 and/or any other known segmentation process. The determining the pose of at least the portion of the patient's spine may further comprise registering the at least one image to the robotic coordinate space (or another known coordinate space), so that the pose of each vertebra depicted in the at least one image, and/or of at least the portion of the spine as a whole, may be determined.

The method 600 also comprises comparing the determined pose with a target pose of at least the portion of the patient's spine (step 612). The target pose may be identified or described in a surgical or other preoperative plan, which may be stored in a memory such as the memory 106 or the database 130, and/or received via a network such as the cloud 134. The target pose may be a pose that will (or is expected to) alleviate one or more symptoms experienced by the patient, and/or otherwise improve the patient's well-being. The target pose may be an intermediate pose to which the spine must be moved before it can be moved to a final pose, or the target pose may correspond to a final desired pose of the spine.

The comparison of the determined pose with the target pose may be a visual comparison, a numerical comparison, or any other type of comparison. For example, the target pose may be overlaid on one or more of the at least one image, so as to provide a visual indication to a surgeon or other user of the progress toward achieving the target pose. As another example, the comparison may be conducted on a per-vertebra basis, and may yield a numerical representation, for each vertebra, of a required amount of movement—for example, in each of an X, Y, and Z direction, and around each of an X, Y, and Z axis—from the vertebra's current pose to reach the target pose. In some embodiments, the results of the comparison may be expressed as a percentage, calculated based on the beginning pose of the vertebra and/or of the portion of the spine (which represents the baseline or 0% progress), a current pose of the vertebra and/or the portion of the spine (with values below 100% representing a current state of under-compensation, and values over 100% representing a current state of over-compensation), and the target pose of at least the portion of the spine (which corresponds to 100% progress). A comparison algorithm such as the comparison algorithm 128, or any other algorithm, may be used for the step 612.

The method 600 beneficially enables determination if a spine or portion thereof has been successfully moved to a target pose, or if under- or over-compensation has occurred. By enabling such determinations intraoperatively, rather than post-operatively, any under- or over-compensation can be immediately corrected, without having to schedule a follow-up surgery, go through a full pre-operative procedure, and re-open previous (or make new) incisions in the patient. Patient trauma is therefore reduced, while the time and resources of all involved parties (the patient, the surgeon, the operating room staff, the hospital or other operating room operator, etc.) are conserved.

Moreover, by combining aspects of the method 600 with aspects of the method 300 (for example), a determination can be made to leave the spine in an under-compensated pose when movement of the spine to the target pose would result in the exertion of excessive force on one or more vertebra of the spine. Similarly, where the target pose is an intermediate pose that is intended to enable a future surgery in which the spine will be moved to a final target pose, and the intermediate target pose can be reached without approaching the predetermined force threshold, a determination can be made to move the spine (and/or individual vertebrae thereof) close to the final target pose, so as to reduce the amount of movement that will be required in the subsequent surgery. In short, the ability to determine, intraoperatively, a progress of the spinal realignment, particularly when combined with an ability to monitor the force required to move one or more elements of the spine, enables improved surgical outcomes, including in terms of clinical objectives, patient safety, resource conservation, and efficiency.

The present disclosure encompasses embodiments of the method 600 that comprise more or fewer steps than those described above, and/or one or more steps that are different than the steps described above.

Figure 7:
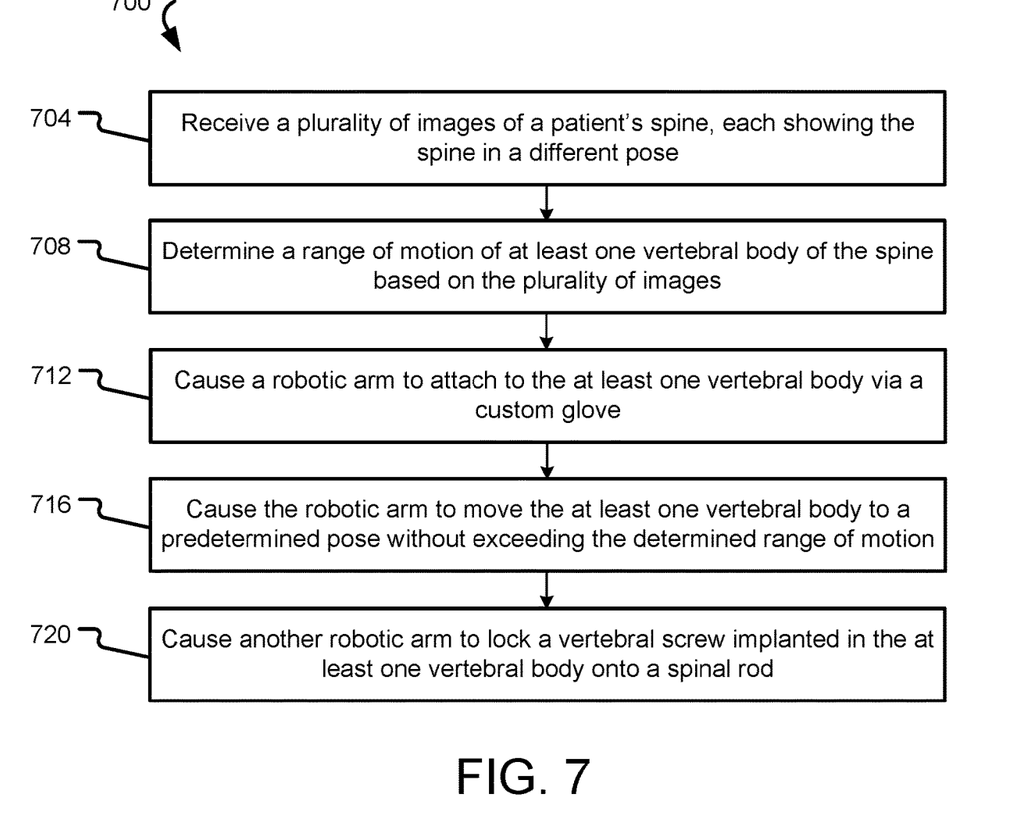
FIG. 7 is a flowchart according to at least one embodiment of the present disclosure.

FIG. 7 depicts a method 700 that may be used, for example, to manipulate a spine into a desired pose. The method 700 may be used, for example, in combination with the method 200, the method 300, the method 400, the method 500, the method 600, and/or in combination with any other method (or any aspect of any method) disclosed herein.

The method 700 (and/or one or more steps thereof) may be carried out or otherwise performed, for example, by at least one processor. The at least one processor may be the same as or similar to the processor(s) 104 of the computing device 102 described above. The at least one processor may be part of a robot (such as a robot 114) or part of a navigation system (such as a navigation system 118). A processor other than any processor described herein may also be used to execute the method 700. The at least one processor may perform the method 700 by executing instructions stored in a memory such as the memory 106. The instructions may correspond to one or more steps of the method 700 described below. The instructions may cause the processor to execute one or more algorithms, such as a path planning algorithm 120, a segmentation algorithm 122, a threshold algorithm 124, a bone quality algorithm 126, and/or a comparison algorithm 128.

The method 700 comprises receiving a plurality of images of a patient's spine, each showing the spine in a different pose (step 704). The plurality of images may show, for example, the patient's spine in a position of flexion, a position of extension, a position of maximum lateral bending to the left, and a position of maximum lateral bending to the right. The plurality of images may be images obtained using an imaging device such as the imaging device 112, or any other imaging device. The plurality of images may be three-dimensional images or two-dimensional images. One or more of the plurality of images may be received directly from the imaging device used to capture the images, and/or from or via a database such as the database 130, a network such as the cloud 134, a memory such as the memory 106, a user interface such as the user interface 110, or a communication interface such as the communication interface 108.

The method 700 also comprises determining a range of motion of at least one vertebral body of the spine based on the plurality of images (step 708). The step 708 may comprise segmenting each of the plurality of images to identify and define the boundaries of one or more vertebra depicted therein. The step 708 may further comprise identifying corresponding vertebra in each of the plurality of images, and comparing the positions of a given vertebra in each of the plurality of images to determine the range of motion of that vertebra.

In some embodiments, a range of motion of the spine as a whole, whether instead of or in addition to a range of motion of one or more individual vertebral bodies, may be determined in the step 708. A range of motion of the spine as a whole may also be determined by comparing the pose of the spine in each of the plurality of images.

The method 700 also comprises causing a robotic arm to attach to the at least one vertebral body via a custom glove (step 712). The robotic arm may be, for example, a robotic arm 116. The custom glove may be a device manufactured specifically to fit the vertebral body in question. Thus, for example, a contour of the vertebral body in question may be determined from one or more images of the vertebral body, and the determined contour may then be used to manufacture a custom glove that at least partially surrounds and may be secured to the vertebral body. The custom glove may be, for example, a 3D-printed coupler. To avoid use of the custom glove necessitating more cutting and/or exposure than already planned, the custom glove may be manufactured preoperatively, based on information (e.g., in a pre-operative plan) about how much of the vertebra to which the custom glove will be attached will be exposed during a surgery.

A custom glove according to embodiments of the present disclosure comprises at least one fixation point to which a robotic arm may attach (e.g., via an end effector such as the end effector 138). When the robotic arm exerts a force on the custom glove via the at least one fixation point, the custom glove distributes the force around the surface of the vertebral body, thus reducing the maximum force exerted on any one portion of the vertebral body. This, in turn, beneficially reduces a likelihood of the vertebral body inadvertently breaking during manipulation thereof. Use of a custom glove may also beneficially enable the robotic arm to exert a greater force on the vertebral body than would otherwise be possible, which may in turn enable the vertebral body to be moved to a target pose (or to a pose approaching the target pose) that would otherwise not be attainable.

In some embodiments, a robotic arm may attach both to a custom glove that at least partially surrounds a vertebra and to a vertebral screw implanted in the vertebra, so as to further distribute applied forces around and through the vertebra.

The custom glove may comprise a rigid or semi-rigid structure. In some embodiments, the custom glove may snap onto the vertebra, while in other embodiments, the custom glove may comprise two or more pieces that may be placed around the vertebra and secured together.

In some embodiments of the present disclosure, a flexible band is used instead of a custom glove. The flexible band may not be customized for any one particular vertebral body, but may instead adapt to the contours of a vertebral body around which it is placed, and thus enable distribution of forces around the vertebral body (e.g., where the band contacts the vertebral body) with similar benefits to the use of a custom glove.

Use of a custom glove as described herein may be especially useful for bones having a low bone quality or that are otherwise at higher risk of breaking during a given procedure. For example, the bones of older patients may be less able to withstand the forces that would be applied thereto by a robotic arm manipulating a screw or hook implanted therein to achieve a surgical objective, such that use of a custom glove would beneficially contribute to improved surgical outcomes.

The method 700 also comprises causing the robotic arm to move the at least one vertebral body to a predetermined pose without exceeding the determined range of motion (step 716). The step 716 may be the same as or similar to the steps 216 and/or 512, provided that the determined range of motion of the vertebral body is taken into account when determining a movement path for the vertebral body and/or when moving the vertebral body along a given path, and movement of the vertebral body is limited so as not to cause the vertebral body to exceed the determined range of motion.

The method 700 also comprises causing another robotic arm to lock a vertebral screw implanted in the at least one vertebral body onto a spinal rod (step 720). The step 720 may comprise, for example, causing a robotic arm (other than the robotic arm that moved the vertebral body in the step 716) to turn a set screw in a head or tulip of the vertebral screw, so as to lock the vertebral screw to the spinal rod. The step 720 may alternatively comprise causing a separate robotic arm to engage any other locking mechanism that locks the vertebral screw onto the spinal rod, or vice versa.

Although the method 700 is described with respect to movement of a vertebral body in which a vertebral screw has been implanted, in some embodiments, the method 700 may be used to move a vertebral body in which no vertebral screw has been implanted. For example, where a vertebral body having a vertebral screw implanted therein needs to be moved a specific distance, but cannot be moved that distance unless an adjacent vertebral body (without a vertebral screw implanted therein) is also moved, then aspects of the method 700 may be utilized to move the adjacent vertebral body, whether simultaneously with movement of the vertebral body having the screw implanted therein or not.

The present disclosure encompasses embodiments of the method 700 that comprise more or fewer steps than those described above, and/or one or more steps that are different than the steps described above.

Figure 8:
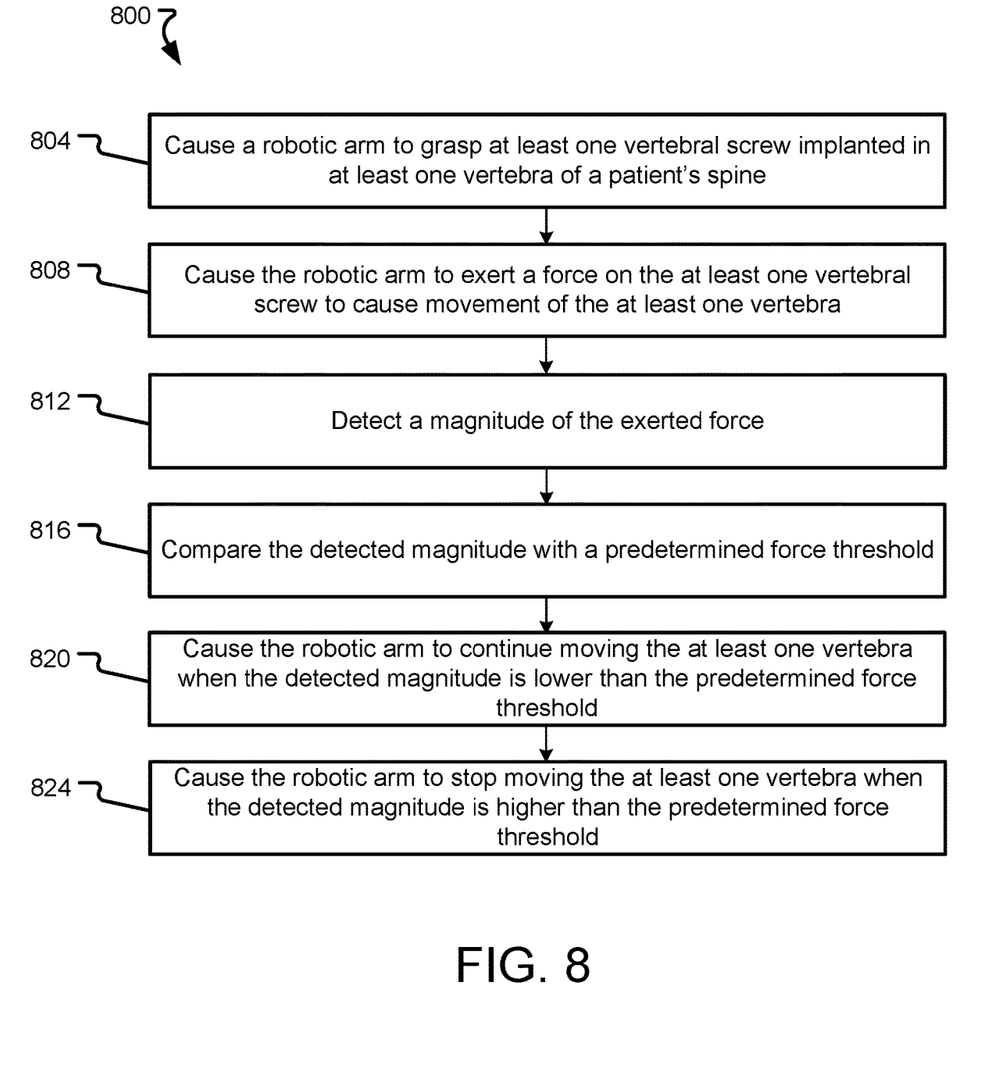
FIG. 8 is a flowchart according to at least one embodiment of the present disclosure.

FIG. 8 depicts a method 800 that may be used, for example, to manipulate a spine into a target pose without exceeding a predetermined force threshold. The method 800 may be used, for example, in combination with the method 200, the method 300, the method 400, the method 500, the method 600, the method 700, and/or in combination with any other method (or any aspect of any method) disclosed herein.

The method 800 (and/or one or more steps thereof) may be carried out or otherwise performed, for example, by at least one processor. The at least one processor may be the same as or similar to the processor(s) 104 of the computing device 102 described above. The at least one processor may be part of a robot (such as a robot 114) or part of a navigation system (such as a navigation system 118). A processor other than any processor described herein may also be used to execute the method 800. The at least one processor may perform the method 800 by executing instructions stored in a memory such as the memory 106. The instructions may correspond to one or more steps of the method 800 described below. The instructions may cause the processor to execute one or more algorithms, such as a path planning algorithm 120 and/or a threshold algorithm 124.

The method 800 comprises causing a robotic arm to grasp at least one vertebral screw implanted in at least one vertebra of a patient's spine (step 804). The step 804 may be the same as or similar to the step 208 of the method 200 and/or the step 508 of the method 500. In the method 800, however, the robotic arm (e.g., a robotic arm 116)—or more specifically, an end effector thereof, such as the end effector 138—vis used to actively grasp the at least one vertebral screw. In some embodiments, the step 804 may comprise causing the robotic arm to grasp a plurality of vertebral screws implanted in a plurality of vertebrae of the patient's spine. In such embodiments, the robotic arm may be equipped with an end effector capable of moving each of the vertebral screws individually, or only of moving all of the vertebral screws collectively. As only two vertebral screws are able to be effectively manipulated simultaneously in manual spinal fixation surgeries, embodiments of the present disclosure in which the robotic arm grasps more than two vertebral screws beneficially represent a significant improvement over such manual spinal fixation surgeries.

The method 800 also comprises causing the robotic arm to exert a force on the at least one vertebral screw to cause movement of the at least one vertebra (step 808). The step 808 may be the same as or similar to the step 216 of the method 200 and/or the step 512 of the method 500. The robotic arm may be caused to exert a force on the at least one vertebral screw by being commanded or otherwise controlled to move from one pose to a different pose. In some embodiments, the purpose of moving the at least one vertebra may be to enable the at least one vertebral screw to be engaged with a spinal rod. In other embodiments, the purpose of moving the at least one vertebra may be to achieve a desired alignment of the at least one vertebra, after which a spinal rod may be attached to the at least one vertebral screw. In still other embodiments, the purpose of moving the at least one vertebra may be to adjust a pose of the at least one vertebra from one pose in which the at least one vertebral screw engages the rod to a different pose in which the at least one vertebral screw engages the rod.

The method 800 also comprises detecting a magnitude of the exerted force (step 812). The step 812 may be the same as or similar to the step 304 of the method 300. For example, one or more force sensors such as the force sensors 142 may be used to detect a magnitude of the exerted force.

The method 800 also comprises comparing the detected magnitude with a predetermined force threshold (step 816). The predetermined force threshold may be a threshold determined, for example, using the method 400. Alternatively, the predetermined force threshold may simply be provided, whether in a surgical plan, via a user interface such as the user interface 110, or otherwise. The comparison may yield, for example, a determination that the detected magnitude is lower than the predetermined force threshold, or a determination that the detected magnitude is higher than the predetermined force threshold. In some embodiments, a detected magnitude that is equal to the predetermined force threshold may be treated as lower than the predetermined force threshold, while in other embodiments, a detected magnitude that is equal to the predetermined force threshold may be treated as higher than the predetermined force threshold.

The method 800 also comprises causing the robotic arm to continue moving the at least one vertebra when the detected magnitude is lower than the predetermined force threshold (step 820). In other words, as long as the detected magnitude does not exceed the predetermined force threshold, the movement of the at least one vertebra may continue along the calculated or otherwise determined path.

The method 800 also comprises causing the robotic arm to stop moving the at least one vertebra when the detected magnitude is higher than the predetermined force threshold (step 824). By stopping movement of the at least one vertebra when the detected magnitude is higher than the predetermined force threshold, unintended breakage of the at least one vertebra can be avoided, thus beneficially improving patient safety. In some embodiments, movement of the at least one vertebra may be reversed, so as to return the vertebra to a pose in which the detected magnitude is lower than the predetermined force threshold.

The present disclosure encompasses embodiments of the method 800 that comprise more or fewer steps than those described above, and/or one or more steps that are different than the steps described above.

As noted above, the present disclosure encompasses methods with fewer than all of the steps identified in FIGS. 2, 3, 4, 5, 6, 7, and 8 (and the corresponding description of the methods 200, 300, 400, 500, 600, 700, and 800), as well as methods that include additional steps beyond those identified in FIGS. 2, 3, 4, 5, 6, 7, and 8 (and the corresponding description of the methods 200, 300, 400, 500, 600, 700, and 800). The present disclosure also encompasses methods that comprise one or more steps from one method described herein, and one or more steps from another method described herein. Any correlation described herein may be or comprise a registration or any other correlation.

The present disclosure describes robotic manipulation of a spine or portion thereof, using one or more robotic arms. In some embodiments of the present disclosure, spinal manipulation may be further achieved by robotic manipulation of the bed or table supporting the patient. For example, in some embodiments, a bed or table that is movable in one or more directions and/or around one or more axes may be manipulated during a surgery, in coordination with movement of one or more robotic arms, to most efficiently achieve a desired movement of a spine or portion thereof relative to the patient's overall anatomy. Tables that may be used in such embodiments are described, for example, in U.S. patent application Ser. No. 17/063,299, filed on Oct. 5, 2020 and entitled "Systems and Methods for Determining and Maintaining a Center of Rotation," the entirety of which is incorporated herein by reference.

Additionally, while aspects of the present disclosure have been described in connection with spinal fixation surgeries or other surgeries involving manipulation of a spine or portion thereof, the present disclosure encompasses the application of the teachings herein to other types of surgeries, including manipulation of anatomical elements other than a spine or portion thereof.

The foregoing is not intended to limit the disclosure to the form or forms disclosed herein. In the foregoing Detailed Description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the foregoing has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for robotic spinal manipulation, comprising:
a first robotic arm comprising an end effector;
a second robotic arm configured to hold a spinal rod;
at least one processor; and
a memory storing instructions for execution by the at least one processor that, when executed, cause the at least one processor to:
control the first robotic arm to link the end effector with a tulip of a first implanted vertebral screw implanted in a first vertebra of a spine of a patient;
control the second robotic arm to hold the spinal rod in a first predetermined pose;
cause, while the end effector of the first robotic arm is linked to the tulip of the first implanted vertebral screw and while the second robotic arm holds the spinal rod in the first predetermined pose, the first robotic arm to move the tulip of the first implanted vertebral screw into engagement with the spinal rod; and
cause the first robotic arm to release the tulip of the first implanted vertebral screw following engagement of the tulip of the first implanted vertebral screw with the spinal rod.

2. The system of claim 1, wherein the memory stores additional instructions for execution by the at least one processor that, when executed, further cause the at least one processor to:
register a robotic coordinate space with a patient coordinate space.

3. The system of claim 2, wherein each of the first robotic arm and the second robotic arm are controllable in the robotic coordinate space.

4. The system of claim 2, wherein the first robotic arm comprises a force sensor for detecting a force exerted by the first robotic arm on the first implanted vertebral screw.

5. The system of claim 4, wherein the memory stores additional instructions for execution by the at least one processor that, when executed, further cause the at least one processor to:
receive information from the force sensor corresponding to a detected force exerted by the first robotic arm on the first implanted vertebral screw; and
control the robotic arm to maintain the detected force below a predetermined threshold.

6. The system of claim 5, wherein the memory stores additional instructions for execution by the at least one processor that, when executed, further cause the at least one processor to:
receive patient information;
calculate a vertebral bone quality based on the patient information; and
generate the predetermined threshold based on the calculated vertebral bone quality.

7. The system of claim 5, wherein the predetermined threshold is received via a user interface.

8. The system of claim 1, wherein the memory stores additional instructions for execution by the at least one processor that, when executed, further cause the at least one processor to:
receive a plurality of images of at least a portion of the spine, the plurality of images generated sequentially during movement of the first implanted vertebral screw into engagement with the spinal rod;
determine a pose of at least the portion of the spine in each of the plurality of images; and
compare the determined pose of at least the portion of the spine to a target pose of at least the portion of the spine.

9. The system of claim 1, wherein the memory stores additional instructions for execution by the at least one processor that, when executed, further cause the at least one processor to:
control the second robotic arm to hold the spinal rod in a second predetermined pose different than the first predetermined pose;
control the first robotic arm to link the end effector with a second implanted vertebral screw implanted in a second vertebra of the patient, the second vertebra different than the first vertebra; and
cause, while the end effector of the first robotic arm is linked to the second implanted vertebral screw and while the second robotic arm holds the spinal rod in the second predetermined pose, the first robotic arm to move the second implanted vertebral screw into engagement with the spinal rod.

10. A system for robotic spinal manipulation, comprising:
at least one processor; and
a memory storing instructions for execution by the at least one processor that, when executed, cause the at least one processor to:
control a first robotic arm to link an end effector attached to the first robotic arm with a first vertebral screw implanted in a first vertebra of a spine of a patient;
control a second robotic arm to hold a spinal rod in a first predetermined pose;
cause, while the end effector of the first robotic arm is linked to the first vertebral screw and while the second robotic arm holds the spinal rod in the first predetermined pose, the first robotic arm to move the first vertebral screw into engagement with the spinal rod;
cause the first robotic arm to release the first vertebral screw following engagement of the first vertebral screw with the spinal rod;
control the second robotic arm to hold the spinal rod in a second predetermined pose different than the first predetermined pose;
control the first robotic arm to link the end effector with a second vertebral screw implanted in a second vertebra of the patient, the second vertebra different than the first vertebra; and
cause, while the end effector of the first robotic arm is linked to the second vertebral screw and while the second robotic arm holds the spinal rod in the second predetermined pose, the first robotic arm to move the second vertebral screw into engagement with the spinal rod.

11. The system of claim 10, wherein the memory stores additional instructions for execution by the at least one processor that, when executed, further cause the at least one processor to:
register a robotic coordinate space with a patient coordinate space.

12. The system of claim 11, wherein each of the first robotic arm and the second robotic arm are controllable in the robotic coordinate space.

13. The system of claim 11, further comprising:
a force sensor for detecting a force exerted by the first robotic arm on the first vertebral screw and the second vertebral screw.

14. The system of claim 10, wherein the memory stores additional instructions for execution by the at least one processor that, when executed, further cause the at least one processor to:
receive a plurality of images of at least a portion of the spine, the plurality of images generated sequentially during movement of the first and second vertebral screws into engagement with the spinal rod;
determine a pose of at least the portion of the spine in each of the plurality of images; and
compare the determined pose of at least the portion of the spine to a target pose of at least the portion of the spine.

* * * * *